Jan. 12, 1965  D. G. HEBERT  3,165,184

COIL SPRING CLUTCH WITH CENTRIFUGAL OPERATOR

Filed Dec. 27, 1962

INVENTOR
DONALD G. HEBERT

BY *Thomas S. Ross*
*Joseph R. Spalla*

ATTORNEYS

United States Patent Office 3,165,184
Patented Jan. 12, 1965

3,165,184
COIL SPRING CLUTCH WITH CENTRIFUGAL
OPERATOR
Donald G. Hebert, South Windsor, Conn., assignor to
Royal McBee Corporation, New York, N.Y., a corporation of New York
Filed Dec. 27, 1962, Ser. No. 247,663
2 Claims. (Cl. 192—105)

This invention relates to speed responsive clutches; more particularly it relates to a positive acting speed responsive friction clutch; and specifically it relates to a speed responsive clutch characterized by a centrifugally actuated wrap spring coupling member.

In many applications which employ low torque motors it is necessary to provide a speed responsive clutch which is operative to connect the motor to a load only after it has attained sufficient speed and torque to drive the load and further to disengage the load from the motor when the torque requirements are greater than can be supplied by the motor thereby to prevent stalling and motor burnout.

As the primary consideration for using such low torque motors is cost saving it is axiomatic that the clutch should also be inexpensive and yet reliable and fast acting.

Accordingly, an object of the invention is to provide a low cost, reliable and fast acting speed responsive clutch.

Another object of the invention is to provide a positive acting speed responsive friction clutch.

A further object of the invention is in the provision of a centrifugally actuated wrap spring clutch.

A still further object of the invention is in the provision of a wrap spring frictional coupling member which is operative to positively couple an input and output member when a centrifugally operated flyweight is driven at a predetermined speed.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
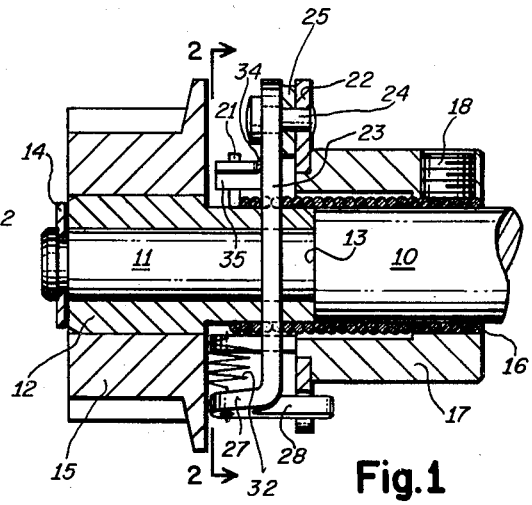
FIGURE 1 is a cross sectional view showing a clutch in accordance with the invention.

Referring now to the drawings wherein like reference numerals designate like or corresponding parts there is shown in FIGURE 1 an input shaft 10 adapted to be coupled to and driven by a low torque motor such as a shaded pole motor (not shown). The terminal portion 11 of input shaft 10 is of smaller diameter as shown in FIGURE 1 and rotatably mounts an output shaft or collar 12 which extends to the shoulder 13 formed by the different diameters of shaft 10. The outer diameter of shaft 12 adjacent the shoulder 13 is the same as the diameter of shaft 10. The output shaft 12 is retained on portion 11 by a snap lock ring 14 and has secured thereto an output pulley 15. Axially surrounding the output shaft 12 and input shaft 10 is a wrap coil spring 16 whose normal inner coil diameter is less than the diameter of shafts 10 and 12. An annular supporting collar 17 surrounding shaft 10 and extending towards the terminal portion thereof is secured to shaft 10 as by a radial set screw 18 which also secures one end, the right end as viewed in FIGURE 1, of the wrap coil spring to the shaft 10. The end 21 of the terminal coil of the portion of the wrap spring surrounding output shaft 12 is bent radially outward as shown in FIGURES 1 and 2 for reasons which will presently be apparent.

Secured to the left end of the supporting collar is an annular mounting disc 22. A centrifugal actuator 23 is pivoted on a stud 24 secured adjacent the periphery of the mounting disc and spaced from the mounting disc by a spacer 25 to provide clearance as required.

Figure 2:
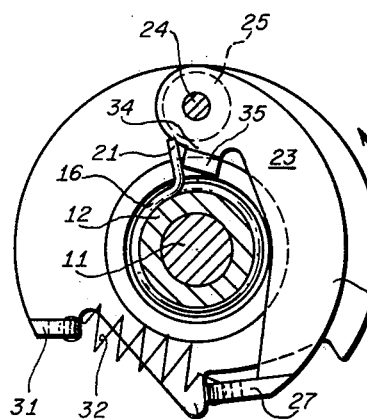
FIGURE 2 is a sectional view taken along lines 2—2 of FIGURE 1.

With reference to FIGURES 1 and 2 the centrifugal actuator is shown as having an arcuate shaped leg 26 extending in a clockwise direction around the shaft 12 to a point almost diametrically opposite the pivot stud. The terminal portion of the arcuate shaped leg is formed with bends 27 and 28 extending respectively from the plane of the actuator to the left and to the right as viewed in FIGURE 1.

Peripheral portions of the disc generally opposite the pivot stud 24 are cut away as shown in FIGURE 2 and one extremity of the cutaway portion is formed with an ear 31 extending leftwardly from the plane of the disc and longitudinally paralleling the leftwardly extending terminal bend 27 of the actuator 23. A biasing spring 32 having one end secured in a hole of the ear 31 formed on the disc and at the other end in a hole in the leftwardly extending bend 27 of the actuator 23 maintains the centrifugal actuator radially inwardly biased to the extent permitted by the coaction of a shoulder 33 on the disc 22 formed by said cutout and the rightwardly extending bend 28 in the terminal portion of the actuator. The centrigual actuator also has a relatively short leg 34 depending substantially vertically from the pivot stud 24 which is formed with a bent off ear 35 which as shown in FIGURE 1 engages the radially outwardly extending end 21 of the coil spring and under the urging of spring 32 biases leg 34 in a direction such that the coil is unwrapped from shaft 12 to the extent that it will not transmit rotary motion to shaft 12.

As will be understood from the above when shaft 10 begins to turn in the counterclockwise direction indicated in FIGURE 2, it will also rotate the disc 22 which carries the centrifugal actuator and as the actuator normally maintains the coil spring 16 unwrapped from shaft 12, the only load on the motor is that of assembly mounting the actuator. As the motor approaches a predetermined speed the actuator will swing radially outwardly due to centrifugal force, overcoming the tension force of spring 32 until, when the shaft 10 reaches predetermined speed the leg 26 of the actuator 23 will have moved away from the coil spring end 21 permitting it to wrap and couple shafts 10 and 12. Where an overload condition is encountered and is reflected back to shaft 12 and via wrap spring 16 to shaft 10, the latter will slow down to the extent that the tension force of spring 32 will overcome the centrifugal force of the actuator 23 which upon swinging radially inwardly will re-engage the end of the wrap spring forcing it to unwrap and decouple shafts 10 and 12. The disengagement of the input and output shafts will occur before the stall speed of the motor whereby it will be permitted to regain its speed and effect a re-engagement provided the overload condition no longer obtains; otherwise the motor speed will oscillate causing engagement and disengagement of the clutch until the overload condition is corrected.

Figure 4:
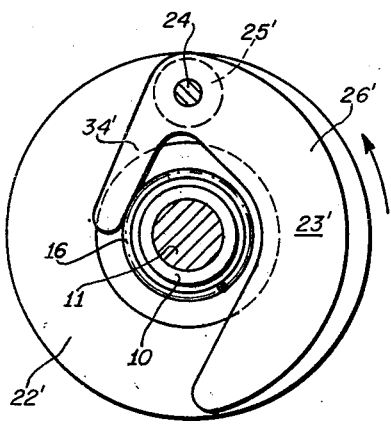
FIGURE 4 is a sectional view taken along lines 4—4 of FIGURE 3.
Figure 3:
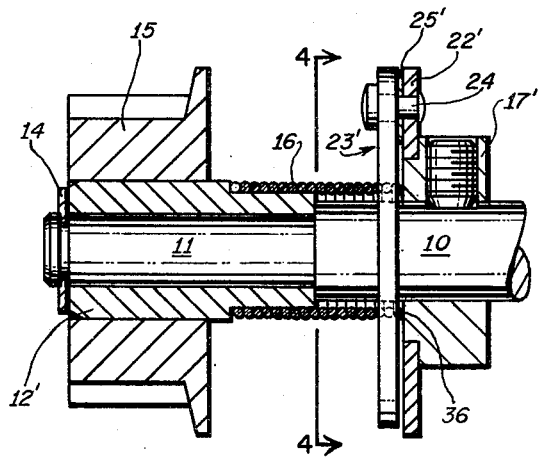
FIGURE 3 is a cross sectional view of another and preferred embodiment of a clutch in accordance with the invention.

Referring now to FIGURES 3 and 4 there is shown a more simplified embodiment of the invention with differently shaped though corresponding parts designated with primed numerals. This embodiment differs from that of FIGURES 1 and 2 in that the outer diameter of the output shaft 12' is slightly larger than that of shaft 10. Further the spring 16 is not normally secured to either the input or output shafts. The inner coil diameter of the spring 16 in this embodiment is less than the diameter of output shaft 12' but greater than the diameter of input shaft 10 such that there is no frictional engagement of the spring coils with the input shaft 10. The differences in diameters shown in FIGURE 3 are shown exaggerated to clearly show the nature of the invention.

In this embodiment the centrifugal actuator 23' is mounted on a simple stamped out flat disc 22' which is secured to a support collar 17' which in turn is secured to input shaft 10. The actuator 23' as shown in FIGURE 4 is also a flat stamping having a C-shape comprising an arcuately shaped leg 26' extending in a clockwise direction from the pivot 24 around the shaft to a point almost diametrically opposite the pivot stud 24. The other leg 34' of the actuator which extends inwardly, normally engages the terminal coil 36 of that portion of the spring 16 surrounding the input shaft.

In this embodiment as the motor approaches speed the actuator 23' will pivot counterclockwise due to centrifugal action and the leg 34' thereof will apply pressure against the terminal coil 36 until, when speed is reached the terminal coil 36 will engage the input shaft 10 whose direction is such that the entire spring 16 will wrap thereby coupling the input and output shafts 10 and 12'. Overload operation will be as described hereinabove, i.e. when the shaft 10 slows due to overload the centrifugal force will diminish permitting the spring 16 to unwrap and assume its normal expanded diameter.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claim is:
1. A centrifugally operable clutch mechanism comprising an input shaft and a coaxial output shaft having the same diameter,
   a wrap coil spring clutch element coaxially encircling said shafts and having a normal diameter less than the diameter of said shafts and attached at one end to said input shaft,
   a collar on said input shaft,
   an annular disc secured to said collar coaxially of said shafts and in proximity to the other end of said coil spring,
   a stud secured to said disc whose axis is parallel to said shaft axis,
   a centrifugal actuator comprising an arcuately shaped lever pivotally mounted on said shaft and adapted to move radially outwardly in response to the attainment of a predetermined speed by said input shaft, said lever having an offset arm positioned in the path of the terminal end of the last coil of the unsecured end of said coil,
   and a tension spring secured to said disc and to the extremity of said lever removed from its pivot for rotatively biasing said lever in a radially inward direction whereby said offset arm acts on said coil end to normally maintain said spring expanded and unwrapped from said output shaft and whereby when the input shaft attains said predetermined speed the radially outward movement of the lever against the force of said tension spring will move said arm away from said end coil permitting the coil spring to contract and frictionally grip said output shaft thereby coupling said input and output shafts.

2. A centrifugally operable clutch mechanism comprising an input shaft and a coaxial output shaft of larger diameter,
   a clutch element adapted to couple said shafts comprising a wrap coil spring coaxially encircling said shafts and having a diameter such that it normally is frictionally gripping the larger diameter output shaft,
   a collar secured to the smaller diameter input shaft,
   an annular disc secured to said collar coaxially of said shafts and in proximity to the terminal coil of the coil portion encircling said smaller diameter input shaft,
   a stud mounted on said disc with its axis parallel to said shaft axes,
   and a centrifugal actuator comprising a flat substantially C-shaped lever pivotally mounted on said stud with a longer portion on one side of said stud adapted to move radially outwardly of said shafts and a shorter portion on the other side of said stud adapted to move radially inwardly of said shafts and to apply contracting pressure to said terminal coil as the speed of said input shaft increases, said radially inwardly movable portion causing said terminal coil to frictionally engage said input shaft at a predetermined speed thereby coupling said shafts.

References Cited by the Examiner

UNITED STATES PATENTS

| | | |
|---|---|---|
| 1,826,054 | 10/31 | Chryst. |
| 1,846,696 | 2/32 | Starkey. |
| 2,360,124 | 10/44 | Greenlee. |
| 2,723,013 | 11/55 | Rogers et al. |
| 2,643,750 | 6/53 | Moulton. |
| 2,930,463 | 3/60 | Dodge et al. |
| 2,954,109 | 9/60 | Jardine _____ 192—81 XR |

FOREIGN PATENTS

| | | |
|---|---|---|
| 622,287 | 6/61 | Canada. |
| 355,355 | 8/61 | Switzerland. |

DAVID J. WILLIAMOWSKY, *Primary Examiner.*